(12) United States Patent
Osterling et al.

(10) Patent No.: US 10,708,868 B2
(45) Date of Patent: Jul. 7, 2020

(54) EVALUATION PERFORMANCE BETWEEN A NETWORK NODE AND A RADIO HEAD

(71) Applicant: Telefonaktiebolaget LM Ericsson (publ), Stockholm (SE)

(72) Inventors: Jacob Osterling, Jarfalla (SE); Tomas Andreason, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/123,566

(22) PCT Filed: Mar. 6, 2014

(86) PCT No.: PCT/SE2014/050279
§ 371 (c)(1),
(2) Date: Sep. 2, 2016

(87) PCT Pub. No.: WO2015/133952
PCT Pub. Date: Sep. 11, 2015

(65) Prior Publication Data
US 2017/0078979 A1 Mar. 16, 2017

(51) Int. Cl.
*H04W 52/24* (2009.01)
*H04W 24/06* (2009.01)
(Continued)

(52) U.S. Cl.
CPC .......... *H04W 52/243* (2013.01); *H04B 17/14* (2015.01); *H04W 24/06* (2013.01); *H04W 52/146* (2013.01); *H04W 88/085* (2013.01)

(58) Field of Classification Search
None
See application file for complete search history.

(56) References Cited

U.S. PATENT DOCUMENTS 5,805,983 A * 9/1998 Naidu .................. H04B 7/0894
455/503
5,809,395 A * 9/1998 Hamilton-Piercy ........................
H04B 7/2609
370/489

(Continued)

FOREIGN PATENT DOCUMENTS

| EP | 2385672 A2 | 11/2011 |
| EP | 2442488 A1 | 4/2012 |
| WO | 9821838 A1 | 5/1998 |

OTHER PUBLICATIONS

A single-pole nine-throw antenna switch, Lee et al, 2008 http://iopscience.iop.org/article/10.1088/0960-1317/18/1/015012/pdf.*

(Continued)

*Primary Examiner* — Jianxun Yang
(74) *Attorney, Agent, or Firm* — NDWE LLP (57) ABSTRACT

A method for evaluating performance between a network node and at least one test radio head, each one of the at least one test radio heads being located remotely from the network node. The method is performed in the network node, and comprises sending a loopback signal to at least one test radio head to add a loopback of its transmission signal on its receiving signal; sending a transmission signal to the at least one test radio head; receiving a received signal from the at least one test radio head; and determining a performance by comparing the received signal with the transmission signal.

23 Claims, 7 Drawing Sheets

(51) Int. Cl.
*H04W 52/14* (2009.01)
*H04B 17/14* (2015.01)
*H04W 88/08* (2009.01)

(56) References Cited

U.S. PATENT DOCUMENTS

2004/0203468 A1* 10/2004 Dent ................. H04B 7/022
455/67.14
2006/0029073 A1* 2/2006 Cervello ........... H04W 74/0816
370/389
2011/0148710 A1* 6/2011 Smid ................. G01S 13/84
342/394

OTHER PUBLICATIONS

NPL search report, Google, 2014 (Year: 2014).*
International Preliminary Report on Patentability for Application No. PCT/SE2014/050279, dated May 23, 2016, 8 pages.
International Search Report and Written Opinion for Application No. PCT/SE2014/050279, dated Dec. 4, 2014, 10 pages.
Written Opinion of the International Preliminary Examining Authority for Application No. PCT/SE2014/050279, dated Mar. 3, 2016, 6 pages.
Communication pursuant to Article 94(3) EPC for EP Application No. 14713611.3, dated Feb. 27, 2019, 7 pages.
Communication under Rule 71(3) EPC for EP Application No. 14713611.3, dated Oct. 16, 2019, 90 pages.
Decision to Grant, EP Application No. 14713611.3, dated Apr. 9, 2020, 2 pages.

* cited by examiner

EVALUATION PERFORMANCE BETWEEN A NETWORK NODE AND A RADIO HEAD

CROSS-REFERENCE TO RELATED APPLICATIONS

This application is a National stage of International Application No. PCT/SE2014/050279, filed Mar. 6, 2014, which are hereby incorporated by reference.

TECHNICAL FIELD

The invention relates to a method, network node, computer program and computer program product for evaluating performance between a network node and at least one radio head.

BACKGROUND

When deploying wireless communication networks, there is a balance between coverage and capacity. On the one hand, a few large cells can provide great coverage but at a cost of reduced capacity. On the other hand, a scenario with many small cells creates better capacity and throughput, but may not provide the desired coverage. Hence, there is often a combination of larger cells to provide sufficient capacity with smaller cells to provide better capacity.

However, when the cells get too small, wireless terminals moving in the network cause a great number of handovers which causes significant overhead. Moreover, providing coverage indoors using many small cells can be quite costly, with a radio base station for each such small cell.

One solution to this problem is to use radio heads being located remotely from a radio base station, where several radio heads connected to the same radio base station share the same cell. In this way, a single radio base station can provide coverage in different parts of the building by placing the radio heads appropriately. Moreover, the wireless device can move between the coverage of different radio heads while staying within the same cell, thus avoiding causing handovers.

The cable between the radio base station and the remote radio heads, however, is often susceptible to interference. There is currently no known way to detect such interference, and no way to take action to reduce any effects of such interference.

U.S. Pat. No. 5,809,395 A discloses a multichannel radiotelephony system providing two way cordless communications with a plurality of multichannel transceivers portable within a coverage area comprised by a plurality of cells, each associated with a base station and antennas, such as to permit channel frequency reuse in cells within the coverage area.

EP 2 385 672 B1 discloses an apparatus including a transmitter configured to transmit symbols to one or more receivers via a plurality of communication channels of a physical communication link. The transmitter is configured to estimate a phase of one or more off-diagonal elements of a channel matrix for the physical communication link based on values of signal-to-interference-plus-noise ratios at the one or more receivers.

EP 2 442 488 A1 discloses a device for detecting a physical link and a method thereof, wherein a detecting end sends a detection signal to a detected end; the detected end returns the detection signal to the detecting end after processing the detection signal that is received; the detecting end re-processes the detection signal that has been processed from the detected end, and determines whether a physical link failure occurs according to the detection signal that is re-processed.

SUMMARY

It is an object to improve determination of performance on between a network node and a radio head being located remotely from the network node.

According to a first aspect, it is presented a method for evaluating performance between a network node and at least one test radio head, each one of the at least one test radio heads being located remotely from the network node. The method is performed in the network node, and comprises the steps of: sending a loopback signal to at least one test radio head to add a loopback of its transmission signal on its receiving signal; sending a transmission signal to the at least one test radio head; receiving a received signal from the at least one test radio head; and determining a performance by comparing the received signal with the transmission signal. This loopback provides an excellent way of determining the performance of all components passed, such as cable(s), cable terminations and analogue components of the test radio head.

The method may further comprise the step of: reducing interference from uplink transmissions of wireless devices on the received signal from the at least one test radio head. Received signals in the uplink from several remote radio heads are combined. Hence, when only a subset of these remote radio heads are set in loopback mode, any uplink transmission resulting in signals received by the other remote radio heads can interfere with the received loopback signal. If the uplink transmissions to the other remote radio heads only occupy a small fraction of the time, this might not be a problem that needs to be addressed. However, if the uplink transmissions to the other remote radio heads occupy a large fraction of the time, the loopback signal is likely to be interfered with by the combination with uplink transmissions to the other remote radio heads. In this case, interference from received signals from other remote radio heads should be avoided The step of reducing interference may comprise the step of: temporarily limiting transmission of uplink transmissions of wireless devices being at risk of transmitting interfering signal. This provides a more pure loopback signal which can thus better evaluate performance.

The step of temporarily limiting may comprise refraining from sending uplink transmission grants to wireless devices connected to the network node. This prevents uplink communication which thus eliminates any uplink interference from wireless devices connected to the network node.

The step of temporarily limiting may comprise limiting uplink power for wireless devices connected to the network node.

The step of reducing interference may comprise the step of: sending a mute signal to any radio heads connected to the network node to which the loopback signal is not sent. The mute signal prevents any received signals, on the same path as the received signal for the loopback, from interfering with the performance evaluation.

The method may further comprise the step of: selecting the at least one test radio head to comprise a plurality of radio heads.

The method may further comprise the steps of: when the step of determining results in a problem being found, repeating the method for a new selection of at least one radio head; and when the step of determining results in that no problems are found, ending the method. In this way, the method can test several radio heads first and, when an issue is found, progressively narrow down the number of radio heads to identify the location of the problem.

The step of determining may comprise determining a cable break when the comparing indicates a large attenuation in a particular frequency band.

The step of determining may comprise determining a cross talk when the comparing indicates a signal to noise ratio being lower than a threshold value.

The step of determining may comprise determining a bad cable termination when the comparing indicates inter symbol interference.

The step of sending a loopback signal may comprise sending a loopback signal to add a loopback of its transmission signal on its receiving signal for only one of a plurality of diversity paths. In this way, other diversity paths can still be used for communication whereby communication availability is not disrupted, even if throughput may be reduced while the testing occurs.

According to a second aspect, it is presented a network node for evaluating performance between the network node and at least one test radio head, each one of the at least one test radio heads being located remotely from the network node. The network node comprises: a processor; and a memory storing instructions. The instructions, when executed by the processor, causes the network node to: send a loopback signal to at least one test radio head to add a loopback of its transmission signal on its receiving signal; send a transmission signal to the at least one test radio head; receive a received signal from the at least one test radio head; and determine a performance by comparing the received signal with the transmission signal.

The network node may further comprise instructions that, when executed by the processor, causes the network node to reduce interference from uplink transmissions of wireless devices on the received signal from the at least one test radio head.

The instructions to reduce interference may comprise instructions that, when executed by the processor, causes the network node to temporarily limit transmission of uplink transmissions of wireless devices being at risk of transmitting interfering signal.

The instructions to temporarily limit may comprise instructions that, when executed by the processor, causes the network node to refrain from sending uplink transmission grants to wireless devices connected to the network node.

The instructions to temporarily limit may comprise instructions that, when executed by the processor, causes the network node to limit uplink power for wireless devices connected to the network node.

The instructions to reduce interference may comprise instructions that, when executed by the processor, causes the network node to send a mute signal to any radio heads connected to the network node to which the loopback signal is not sent.

The network node may further comprise instructions that, when executed by the processor, causes the network node to select the at least one test radio head to comprise a plurality of radio heads.

The network node may further comprise instructions that, when executed by the processor, causes the network node to, when the instructions to determine results in a problem being found, repeat the evaluation of performance for a new selection of at least one radio head of at least one radio head; and when the instructions to determining results in that no problems are found, ending the evaluation of performance.

The instructions to determine may comprise instructions that, when executed by the processor, causes the network node to determine a cable break when the comparing indicates a large attenuation in a particular frequency band.

The instructions to determine may comprise instructions that, when executed by the processor, causes the network node to determine a cross talk when the comparing indicates interference.

The instructions to determine may comprise instructions that, when executed by the processor, causes the network node to determine a bad cable termination when the comparing indicates inter symbol interference.

The instructions to send a loopback signal may comprise instructions that, when executed by the processor, causes the network node to send a loopback signal to add a loopback of its transmission signal on its receiving signal for only one of a plurality of diversity paths.

According to a third aspect, it is presented a network node comprising: means for sending a loopback signal to at least one test radio head to add a loopback of its transmission signal on its receiving signal, wherein each one of the at least one test radio heads is located remotely from the network node; means for sending a transmission signal to the at least one test radio head; means for receiving a received signal from the at least one test radio head; and means for determining a performance by comparing the received signal with the transmission signal.

The network node may further comprise means for reducing interference from uplink transmissions of wireless devices on the received signal from the at least one test radio head.

The means for reducing interference may further comprise means for temporarily limiting transmission of uplink transmissions of wireless devices being at risk of transmitting interfering signal.

The means for temporarily limiting may comprise means for refraining from sending uplink transmission grants to wireless devices connected to the network node.

The means for temporarily limiting may comprise means for limiting uplink power for wireless devices connected to the network node.

The means for reducing interference may further comprise means for sending a mute signal to any radio heads connected to the network node to which the loopback signal is not sent.

The network node may further comprise means for selecting the at least one test radio head to comprise a plurality of radio heads.

The means for determining may comprise means for determining a cable break when the comparing indicates a large attenuation in a particular frequency band.

The means for determining may comprise means for determining a cross talk when the comparing indicates a signal to noise ratio being lower than a threshold value.

The means for determining may comprise means for determining a bad cable termination when the comparing indicates intersymbol interference.

The means for sending a loopback signal may comprise means for sending a loopback signal to add a loopback of its transmission signal on its receiving signal for only one of a plurality of diversity paths.

According to a fourth aspect, it is presented a computer program for evaluating performance between a network node and at least one test radio head, each one of the at least one test radio heads being located remotely from the network node. The computer program comprises computer program code which, when run on the network node causes the network node to: send a loopback signal to at least one test radio head to add a loopback of its transmission signal on its receiving signal; send a transmission signal to the at least one test radio head; receive a received signal from the at least one test radio head; and determine a performance by comparing the received signal with the transmission signal.

According to a fifth aspect, it is presented a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

FIGS. 1A-D are schematic diagrams illustrating a wireless communication networks 3 being environments where embodiments presented herein can be applied. Considering first FIG. 1A, the wireless communication network 3 comprises a number of remote radio heads 1a-c for installation in locations where traditional deployment with antennas being co-located with the radio base stations is not ideal. For example, the wireless communication network 3 can be installed indoors, such as in an office, shopping centre, train station or airport.

It is to be noted that, while the embodiments presented herein are described as implemented using LTE (Long Term Evolution), any applicable communication standard may be used, such as any one or a combination of LTE-SAE (Long Term Evolution—System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

A radio base station 7 here comprises a baseband module 18 and an intermediate radio unit (IRU) 5. The IRU 5 is in turn connected to a number (in this example three) remote radio heads 1a-c via respective cables 9a-c. The term network node is used to denote either one of the radio base station 7 or the IRU 5. The remote radio heads 1a-c connected to the IRU 5 are part of a single cell 6 and thus share a cell identifier. Antennas do not need to be included in this embodiment of the radio base station 7 or the IRU 5, as the remote radio heads 1a-c provide the wireless link to one or more wireless devices 2a-b. The wireless link provided by the remote radio heads 1a-c includes both downlink (DL) communication to the wireless devices 2a-b and uplink (UL) communication from the wireless devices 2a-b. The term wireless device is also known as mobile communication terminal, user equipment (UE), station (STA), mobile terminal, user terminal, user agent, machine-to-machine devices etc., and can be, for example, what today are commonly known as a mobile phone or a tablet/laptop with wireless connectivity or fixed mounted terminal. The term remote radio head is used herein to denote a radio head being located remotely from a network node being the radio base station 7 or the IRU 5 of FIGS. 1A-D.

In radio communication systems, the data is transmitted and received over the air at a specific radio frequency—either the same for transmission and reception or on separate frequencies. This is often called the radio frequency (RF) or the carrier frequency.

There are many different carrier frequencies, depending on regional spectrum allocation and spectrum license rights. To create a common radio implementation supporting this variety of carrier frequencies, a second set of frequencies is introduced, denoted the Intermediate Frequency (IF), which is used for communication on the cables 9a-c between the IRU 5 and the remote radio heads 1a-c.

Figure 1A:
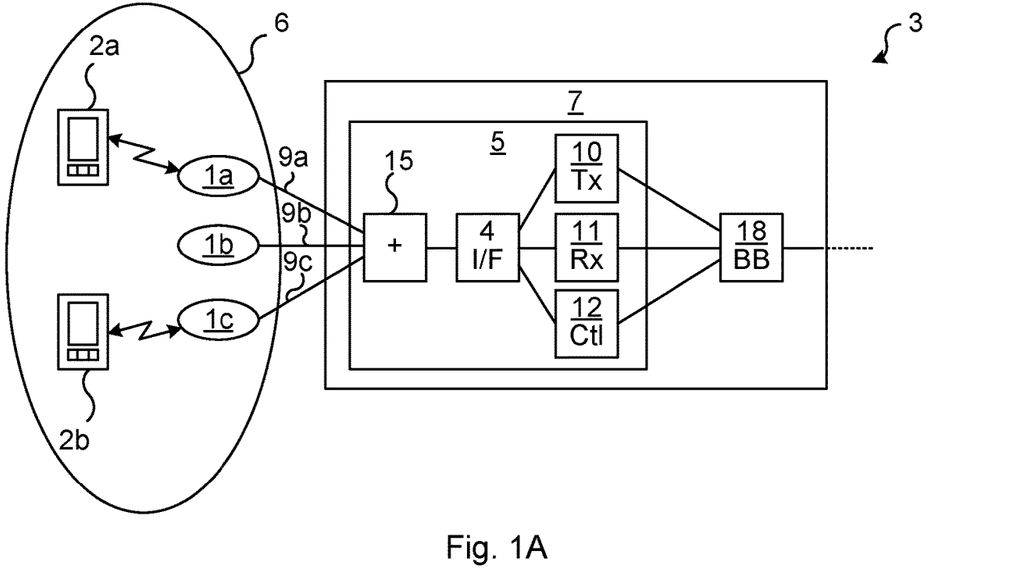
FIGS. 1A-D are schematic diagrams illustrating environments where embodiments presented herein can be applied.

For uplink communication, the remote radio heads 1a-c downconvert a received (uplink) signal to IF and send it over its cable 9a-c to the IRU 5. In this embodiment, the received IF signals are combined in a combiner 15 and fed to an interface circuitry 4. The interface circuitry 4 extracts the received IF signal from the interface and forwards it to the RX (reception) back-end 11. The RX back-end 11 downconverts the received signals from IF to an analogue BB (baseband) signal which is further filtered and digitized. The RX back-end 11 sends the combined received signals in digital form to the baseband module 18 for further processing such as demodulation, decoding, etc. as known in the art per se.

Optionally, the remote radio heads 1a-c are also powered over the respective cables 9a-c.

For downlink communication, the process works in reverse to the uplink. Hence, the baseband module 18 sends a digital BB signal for transmission to a TX (transmission) back-end 10 of the IRU 5. The TX back-end 10 pulse shapes the digital BB signal to an analogue transmission signal and upconverts the transmission signal to IF. The transmission signal in IF is then inserted onto the interface by the interface circuitry 4, and provided to the combiner 15 which also functions as a splitter, providing the same transmission signal in IF to all connected remote radio heads 1a-c over the respective cables 9a-c. The remote radio heads 1a-c then upconverts the IF signal to RF and transmits the RF signal over the air to the wireless devices 2a-b.

It is to be noted that the processing of signals in the IRU 5 and the remote radio heads 1a-c do not need to occur in the digital domain and can be (but do not need to be) performed completely in the analogue domain.

The remote radio heads 1a-c converts from IF to RF for downlink transmission and from RF to IF for uplink reception. Conversely, the IRU converts from digital BB to IF for downlink transmission and from IF to digital BB for uplink reception.

By using IF over the cables 9a-c instead of RF, cheaper, low quality cables can be used, such as CAT5, CAT5e or CAT6 cables. In this way, existing indoor cabling can many times be reused during installation, which significantly saves cost and installation time.

Moreover, there is a control link between a processor 12 in the IRU 5 and each remote radio head 1a-c. This control link can be used e.g. to set one or more of the remote radio heads 1a-c in loopback mode, mute other remote radio heads, etc. The control link can e.g. be implemented using HDLC (High-Level Data Link Control) and FSK (Frequency-shift keying) modulation on the same cable as the received and transmitted signals are sent. Alternatively, pure Ethernet communication can be used, where the control link is passed through a low pass filter or a band pass filter to leave bandwidth for transmission data and received data. If a second cable is available, this can of course be dedicated to the control link.

The transmission and reception is under the control of the MAC (Media Access Control) scheduler in the baseband module 18. The MAC scheduler informs what transmissions should be made and informs, via the downlink signaling, the wireless devices when to transmit and on which frequency and power.

It is to be noted that, although FIG. 1A shows the baseband module 18 connected to one IRU 5, each baseband module 18 can be connected to several IRUs. Each IRU may have its own cell or several IRUs may share a single cell.

It is to be noted that while the embodiment of FIG. 1A shows three remote radio heads 1a-c, there may be fewer or more remote radio heads connected to each IRU 5.

Figure 1B:
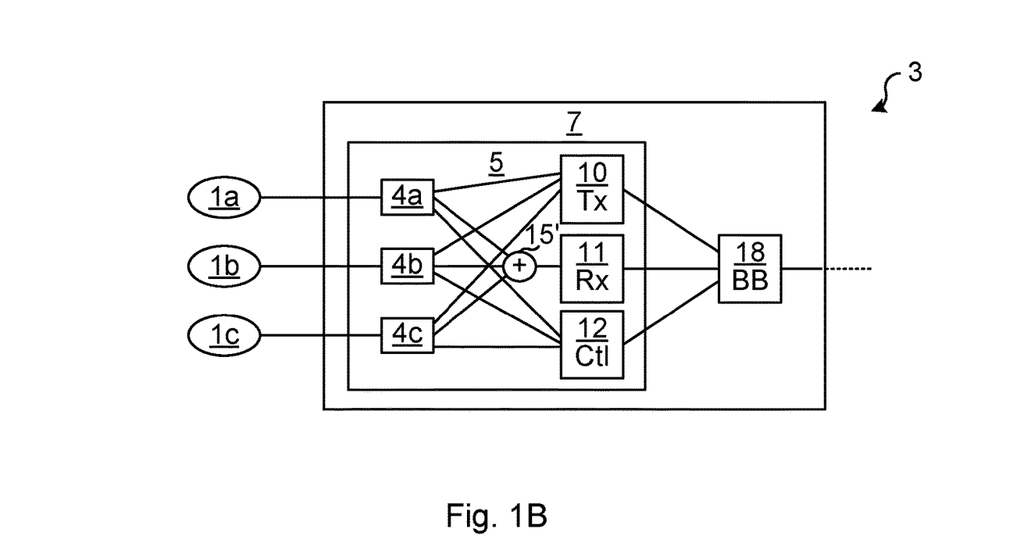

The embodiment shown in FIG. 1B is similar to the embodiment of FIG. 1A, and only differences to the embodiment of FIG. 1A will be described. In this embodiment, there are several instances of interface circuitry 4a-c, one for each remote radio head. Transmission signals are sent in IF from the transmission back-end 10 to each one of the interface circuitry 4a-c, either directly or via a splitter (not shown). Analogously, control signals are sent between the processor 12 and each one of the interface circuitry 4a-c, either directly or via a splitter (not shown). Received signals are sent in IF from the respective interface circuitry 4a-c to a combiner 15' which may here be a pure combiner without splitting functionality.

In this embodiment, the control link between the IRU 5 and the remote radio-heads 1a-c can be point-to-point, which prevents collision and reduces multiplexing needs of control messages to different remote radio heads 1a-c. Also, some measurements can be done on each individual link, in the IRU 5, e.g. power measurements.

Furthermore, in this embodiment, different intermediate frequencies may be used on the different interfaces to best adapt to each interface interference and transmission characteristics. Thus, the TX back-end 10 may send the transmission signal using different IF frequencies to the different instances of interface circuitry 4a-c, and the RX back-end 11 downconverts from different IF frequencies for the different instances of interface circuitry 4a-c.

The embodiment shown in FIG. 1 is similar to the embodiment of FIG. 1A but shows a situation where two diversity paths are used, e.g. for MIMO (Multiple Input Multiple Output). Only differences to the embodiment of FIG. 1A will be described here. In this embodiment, there are a first combiner 15a and a second combiner 15b, each related to separate diversity path. Each combiner 15a-b has a separate link to the RX back-end 11. Moreover, the links between the instances of interface circuitry 4a-c and the two combiners 15a-b are separated. The cables 9a-c between the IRU 5 and the remote radio heads 1a-c each carries several diversity paths, either in separate wire pairs or multiplexed on the same wire pair.

Figure 1C:
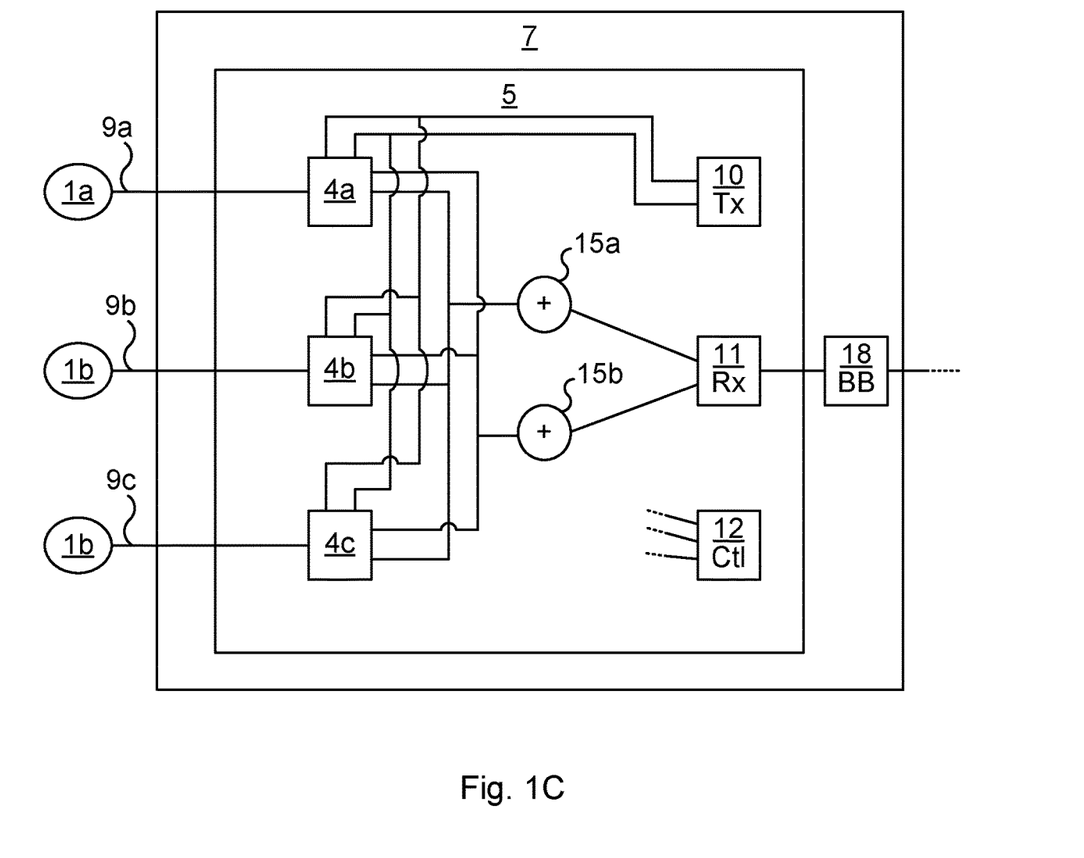

For received signals, the instances of interface circuitry 4a-c separate the two diversity paths of the cables 9a-c and direct the received signals of the two diversity paths to the first and second combiners 15a-b, respectively. Hence, each one of the combiners 15a-b is related to a separate diversity path and combines signals from all connected remote radio heads 1a-c for the same diversity path. The link between the RX back-end 11 and the baseband module 18 is digital and can keeps the combined signals separate for each diversity paths.

Analogously, the TX back-end 10 transmits transmission signals for two separate diversity paths to the instances of interface circuitry 4a-c. The interface circuitry 4a-c sends the transmission signals to the remote radio heads 1a-c while keeping the transmission signals for the two diversity paths separate.

It is to be noted that while it is here shown two diversity paths, the IRU and remote radio heads can be expanded to support a greater number of diversity paths, for transmission and/or reception.

In order not to complicate the diagram of FIG. 1C unnecessarily, the connections between the processor 12 and the instances of interface circuitry 4a-c are not explicitly shown here.

Figure 1D:
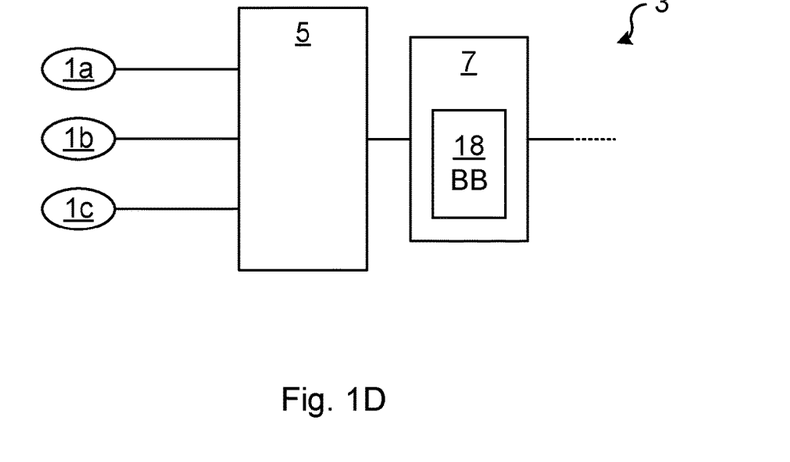

FIG. 1D is a schematic diagram illustrating an alternative embodiment in terms of IRU and radio base station. Here, the IRU 5 is separate, but connected to, the radio base station 7. The IRU 5 itself can be implemented e.g. as shown in FIGS. 1A-C.

Figure 2A:
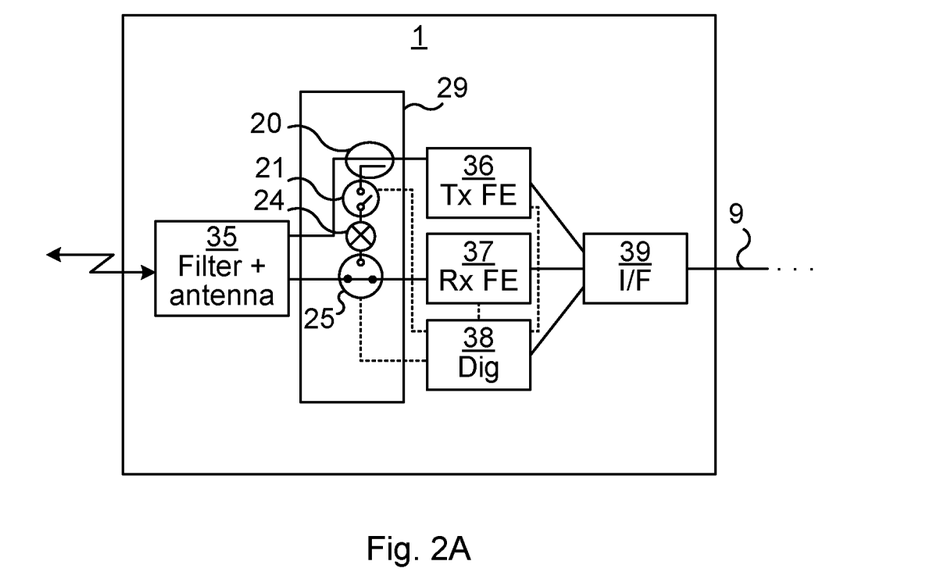
FIGS. 2A-B are schematic diagrams illustrating components of embodiments of a remote radio head of FIGS. 1A-D.
Figure 2B:
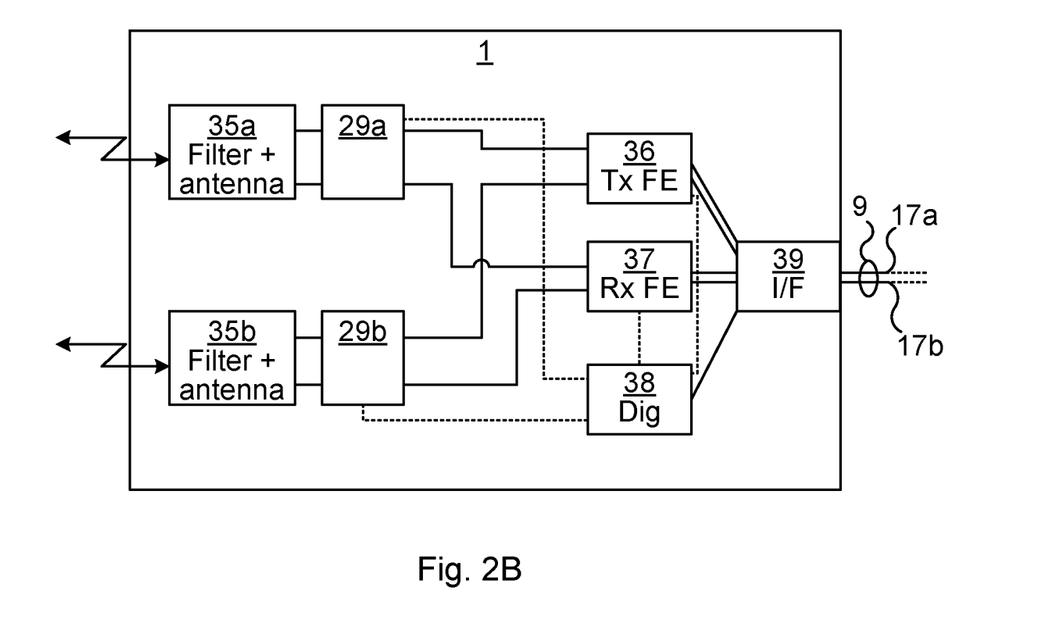

FIGS. 2A-B are schematic diagrams illustrating components of embodiments of a remote radio head of FIGS. 1A-D, here represented by a single remote radio head 1.

First, the embodiment of FIG. 2A will be described. The remote radio head 1 comprises an interface circuitry 39, a transmission front-end 36, a reception front-end 37, a digital unit 38 and an antenna device 35. Moreover, to be there is a coupler 20, a first switch 21, a mixer 24 and a second switch 25. The coupler 20, first switch 21, mixer 24 and second switch 25 are collectively denoted a loopback block 29.

Figure 4A:
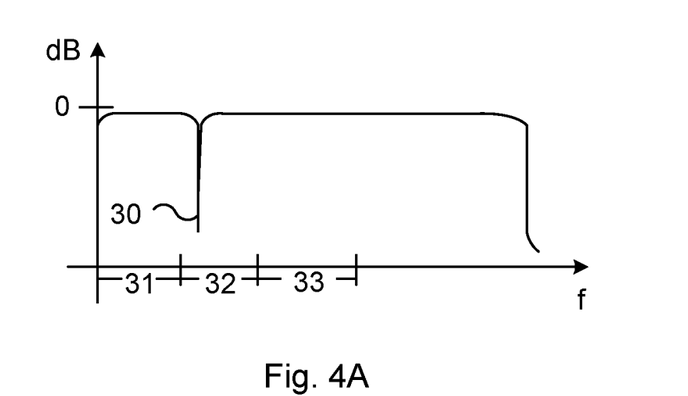
FIGS. 4A-B are schematic graphs illustrating a possible effect of the interference of FIGS. 3A-B.

In line with what is explained above, in normal operation, the RX Front End 37 downconverts received signals in RF to IF for transfer over the cable 9 to the IRU 5. Moreover, the TX Front End 36 upconverts transmission signals from IF, as received over the cable 9 from the IRU 5 to RF for transmission to wireless devices. The antenna device 35 comprises one or more antennas for transmission of RF signals and reception of RF signals. The antenna device 35 may also comprise appropriate filters to filter out unwanted signals. The interface circuitry 39 inserts and extracts (multiplexes and demultiplexes) the transmission IF signal, the received IF signal and the control signal onto the cable 9. The interface circuitry 39 may use different frequency bands for each of the different signals, as seen in FIG. 4A and explained below.

A digital unit 38 communicates with the processor 12 of the IRU. For example, the digital unit 38 may be commanded by the processor 12 to set the remote radio heads 1 in loopback mode or to mute any received signals.

Additionally, the digital unit 38 can be commanded by the processor 12 of the IRU to alter frequencies used by the TX Front End 36 and/or the RX Front End 37 for upconversion and/or downconversion. The digital unit 38 can be implemented using software instructions such as a computer program executing by a processor and/or using hardware, such as application specific integrated circuits, field programmable gate arrays, discrete logical components, etc. Paths for control signals from the digital unit 38 to other components of the remote radio head 1 are indicated with dashed lines.

The remote radio head 1 can be controlled to be in loopback mode or normal mode. In normal mode, the remote radio head 1 operates as described above. In loopback mode, on the other hand, the transmission signal is fed back to the receiving path and is fed back uplink to the IRU 5 and/or the radio base station 7. The purpose of the loopback mode is that a known transmission signal is looped back as a received signal, whereby any issues, such as interference, cable problems and/or faulty components or installations can be identified. The switching between the loopback mode and normal mode occurs when the digital unit 38 received a command to switch mode from the processor 12 of the IRU. The digital unit 38 is connected the first switch 21 and the second switch 25 to thereby control the mode of the remote radio head 1.

The coupler 20 receives a small portion of the transmission signal which is thus forwarded to the first switch 21. In loopback mode, the first switch 21 is in a conducting state and the transmission signal from the coupler is forwarded to the mixer 24. The purpose of the mixer 24 is to move the transmission signal frequency wise to a frequency band which is used for received signals. The output of the mixer 24 is connected to the second switch 25. In loopback mode, the second switch 25 connects the output of the mixer with the RX front end 37. The transmission signal is thus looped back as a received signal, which is then transmitted to the IRU 5 and/or the radio base station 7. In this way, the IRU 5 and/or the radio base station 7 can evaluate the performance of any intermediate cables and/or circuitry passed through, such as the interface circuitry 39, the TX front end 36 and the RX front end 37.

In normal mode, the second switch 25 is controlled to connect the filter and antenna 35 with the RX front end 37 such that signals from any wireless devices can be received using the antenna. Moreover, the first switch 21 can be set in a blocked state to minimise the risk for spurious emission.

Optionally, the remote radio head 1 can also be controlled to be in a mute mode, where no signal is sent uplink by the RX front end 37. The mute mode can be used when one or more other remote radio heads are in loopback mode, whereby the remote radio head in mute mode does not add any interference to the receiving signal which is combined for several remote radio heads in the IRU, as described above.

The mute mode can be implemented in several different ways. For example, the first switch 21 can be set in a blocked state while the second switch 25 is set to connect the mixer 24 with the RX front end 37. Alternatively or additionally, the gain of the RX front end 37 can be reduced or another switch can be introduced between the RX front end 37 and the interface circuitry 39. Also the mute mode is controlled by the digital unit 38 as commanded over the control interface from the processor 12 of the IRU.

It is to be noted that each remote radio head 1 can be controlled independently with regard to what mode to assume.

The embodiment of FIG. 2B will now be described, where several diversity paths are shown. In this embodiment, there is a first set of filter and antenna 35a and a second set of filter and antenna 35b. The two sets of antennas can be spaced apart to provide spacial diversity for use with MIMO. The two antennas can be used separately or in concert to improve performance, e.g. by increasing throughput.

There is further a first loopback block 29a connected to the first set of filter and antenna 35a and a second loopback block 29b connected to the second set of filter and antenna 35b.

The TX front end 36 is connected to both loopback blocks 29a-b and therefore also to both sets of filter and antennas 35a-b. Analogously, The RX front end 37 is connected to both loopback blocks 29a-b and therefore also to both sets of filter and antennas 35a-b. The digital unit 38 is connected to both loopback blocks 29a-b.

The cable 9 comprises a first sub-cable 17a and a second sub-cable 17b. The first and second sub-cables can e.g. be separate wire pairs of the same cable. For instance, if the cable 9 is a CAT5, CAT5e or CAT6 cable, there are several instances of twisted pair wires that can be used. Alternatively, the first sub-cable 17a and the second sub-cable 17b are separate cables. In one embodiment, the two sub-cables 17a-b are virtual and the signals of the two sub-cables are multiplexed using one wire pair, e.g. using frequency multiplexing.

In this embodiment, the first sub-cable 17a supports control signals and a first diversity path, both for downlink and uplink and control signals, e.g. multiplexed using frequency multiplexing. The second sub-cable 17b supports a second diversity path, both for downlink and uplink, e.g. multiplexed using frequency multiplexing. Optionally, the second sub-cable 17b is a backup for control signals if the control signalling over first sub-cable 17a were to fail.

The interface circuitry 39 provides transmission signals from the first diversity path and the second diversity path of the two sub-cable 17a-b separately to the TX front-end 36. Analogously, the interface circuitry 39 separately receives received signals from the TX front-end 36 of the first diversity path and the second diversity path and feeds these to the first sub-cable 17a and the second sub-cable, respectively.

In this way, the two diversity paths for both transmission and reception can be implemented using the remote radio head 1.

It is to be noted that while the remote radio head 1 is here shown with two diversity paths, the remote radio head can be expanded to support a greater number of diversity paths, for transmission and/or reception.

The two diversity paths can be utilised in the loopback mode. For instance, the first diversity path can be set in loopback mode as described with reference to FIG. 2A above, while the second diversity path is still in normal mode. While this may reduce performance (e.g. throughput) temporarily, communication is still possible with this arrangement. After this test is done, the second diversity path can be set to be in loopback mode while the first diversity path is set to be in in normal mode.

Alternatively, all diversity paths of a remote radio head are used in loopback mode for one or more remote radio heads 1 at a time, to reduce any effects of cross talk.

Figure 3A:
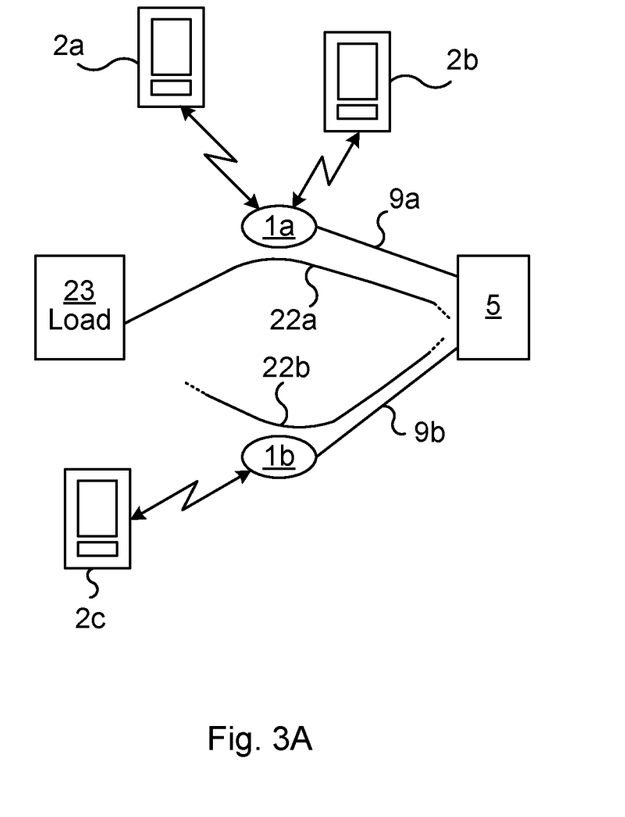
FIGS. 3A-B are schematic diagrams illustrating how interference from external sources can affect embodiments of the systems of FIGS. 1A-D.
Figure 3B:
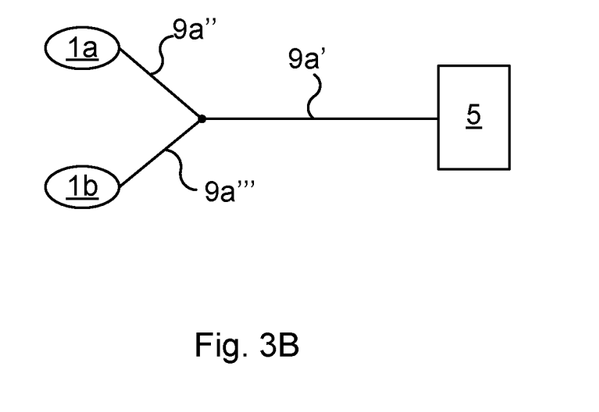

FIGS. 3A-B are schematic diagrams illustrating how interference from external sources can affect embodiments of the systems of FIGS. 1A-D. The example scenario shown in FIG. 3A will be described first. The cables 9a-b between the IRU 5 and the remote radio heads 1a-b are often provided in cable channels which also hold other cables. In this example, there is a first cable 9a between the IRU 5 and a first remote radio head 1a. Furthermore, there is a second cable 9b between the IRU 5 and a second remote radio head 1b.

In the example shown, there is here a first interfering cable 22a which is in the vicinity of the first cable 9a. The two cables 9a, 22a might share a cable channel for a section of their path. The first interfering cable 22a can e.g. be an alternating current (AC) power cable connected to a load 23. There is a particularly large risk of interference when the load 23 is inductive, such as when the load 23 comprises a motor, e.g. to power a fan. Hence, the first cable 9a experiences interference, in this case from a first interfering cable 22a. Analogously, the second cable 9b experiences interference from a second interfering cable 22b.

The interfering cable 22a can also be another cable carrying IF signals, i.e. with similar properties as the first cable 9a. Interference can be caused if selection of IF signals is uncoordinated, e.g. if 22a is a cable connecting a remote radio head and another IRU than the IRU 5 shown in FIG. 3B, within the scope of the same or another radio base station.

The interference may cause disruptions in the uplink and/or downlink communication and may lead to retransmissions and lower throughput.

According to embodiment presented herein, the interference on the cables can be detected by using the loopback mode described above. This is also explained in more detail with reference to FIGS. 7A-B below.

FIG. 3B shows an example where the IRU 5 is connected to the first remote radio head 1a and the second remote radio head 1b. Here, there is a first cable section 9a' shared for both connections. This is then split into a second cable section 9a" only for the first remote radio head 1a and a third cable section 9a''' only for the second remote radio head 1b.

When loopback is employed to locate any issues, a first iteration can perform loopback using both the first and the second remote radio heads 1a-b. If an initial issue is found, loopback can be employed on one or both remote radio heads 1a-b individually. If the initial issue is then present in only the individual loopback of the first remote radio head 1a, the issue is related to the second cable section 9a" or the first remote radio head 1a. On the other hand, if the initial issue is then present in only the individual loopback of the second remote radio head 1b, the issue is related to the third cable section 9a''' or the second remote radio head 1b. If the initial issue is present in both individual loopbacks, the issue can be related to the first cable section 9a', or it can be an identical problem on both individual sections.

Figure 4B:
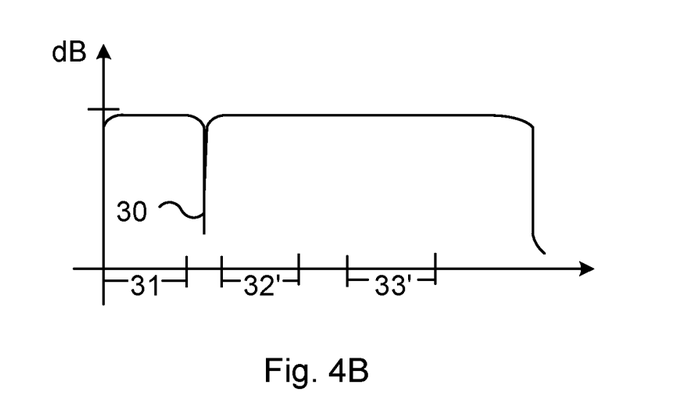

FIGS. 4A-B are schematic graphs illustrating a possible effect of the interference of FIGS. 3A-B. A signal quality is plotted against the vertical axis represents signal loss and the horizontal axis represents frequency. The signal loss is obtained by comparing the transmission signal and received signal through loopback of one or more remote radio heads. The graphs illustrate use of the frequency spectrum and interference in IF, e.g. on the cables of FIGS. 3A-B.

Looking first to FIG. 4A, there are here three frequency sections 31-33. A first frequency section 31 is used for control signals (e.g. between the processor 12 of the IRU 5 and the digital unit 38 of the remote radio heads 1). A second frequency section 32 is used for received signals, which have been downconverted from RF by the RX front end of the remote radio head. A third frequency section 33 is used for transmission signals, which have been upconverted from BB by the TX backend of the IRU 5. In this way, control signals, received signals and transmission signals are frequency multiplexed on the same cable. It is to be noted that the various frequency sections 31-33 are only schematic and not to scale.

There is a dip 30 shown here, indicating low signal quality, e.g. low SNR (Signal to Noise Ratio). Significantly, the dip 30 has a frequency within the second frequency section 32. Hence, the dip 30 causes issues for received signals which are likely to affect performance on received signals.

According to embodiments presented herein, such dips can be detected by spectral analysis of the received signal looped back signal compared with the originally transmitted signal. Once the dip is detected, appropriate action can be taken to reduce or even eliminate the effects of the issue, e.g. by moving one or more frequency sections in the frequency spectrum. Looking now to FIG. 4B, the second frequency section 32 has now moved in frequency to a new second frequency section 32' in order to avoid overlapping with the dip 30. The third frequency section 33 has moved to a new third frequency section 33' in order to avoid overlapping with the frequency band of the new second frequency section 32'.

Hence, by correctly identifying the frequency of the dip in SNR, the effects of the interference are essentially eliminated by using other parts of the available spectrum.

It is to be noted that there are upper limits to what frequencies can be used, indicated by the dip of the signal quality at the far right of FIGS. 4A-B. The upper limit depends on the type of cable used. For example, the upper limit of a CAT6 cable is much higher than that of a CAT5 cable.

Figure 5A:
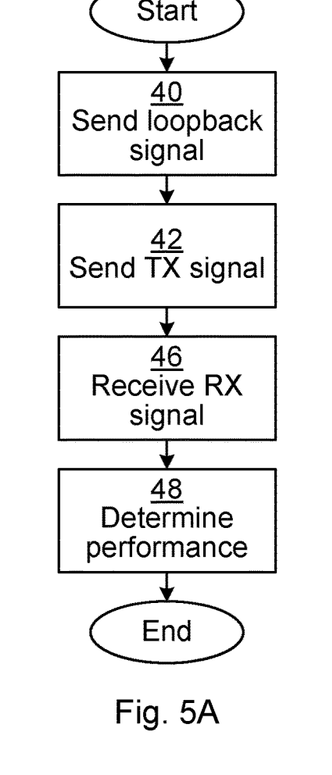
FIGS. 5A-B are flow charts illustrating methods performed in a network node of FIGS. 1A-D for evaluating performance between a network node and at least one test radio head.
Figure 5B:
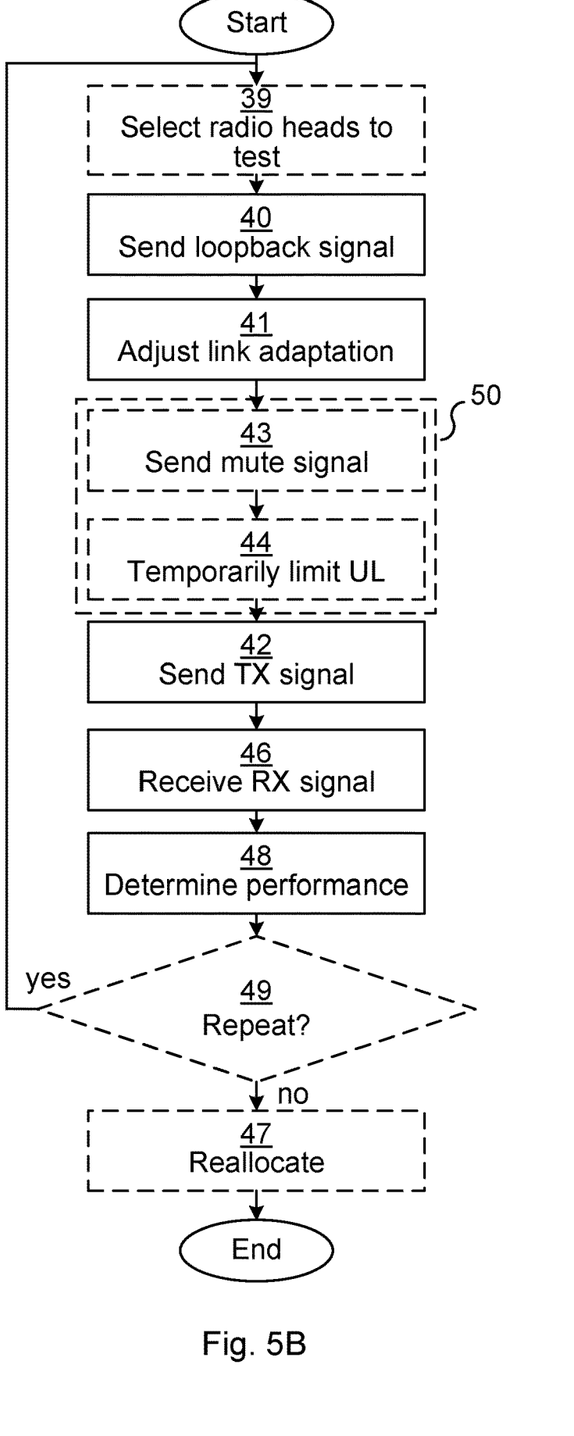

FIGS. 5A-B are flow charts illustrating methods performed in a network node of FIGS. 1A-D for evaluating performance between a network node and at least one test radio head. The network node can be the radio base station 7 or the IRU 5 of FIGS. 1A-D. The methods utilise the loopback mode described above. The method can be started periodically or on request from an operator.

In a send loopback signal step 40, a loopback signal is sent to at least one test radio head to add a loopback of its transmission signal on its receiving signal. The loopback signal is sent over the control link between to the one or more test radio heads. In one embodiment, the loopback signal is a signal to add a loopback of its transmission signal on its receiving signal for only one (or a strict subset) of a plurality of diversity paths. In this way the other diversity path(s) can still be used for communication while the loopback is active. On further iterations, the other diversity path(s) can be tested using loopback.

The loopback signal can include a time period for when the loopback should be applied. This can include both a start time and a stop time or only an end time (whereby the start time is implied to be immediately or a predetermined time after reception of the loopback signal). If no time period is provided, the test time period can be predetermined to end at a certain amount of time after the loopback signal is received.

In a send TX signal step 42, a transmission signal is sent to the at least one test radio head. This is sent in the transmission band (33 of FIG. 4A). The transmission signal is a known signal and can e.g. be in the form of an analogue signal over a determined frequency band, e.g. comprising a number of predetermined suitably coded symbols. The transmission signal is sent such that it is looped back as commanded in the send loopback signal step 40. In other words, when the loopback command only relates to one (or a subset) of a plurality of diversity paths, the transmission signal for loopback needs to only relate to the diversity path(s) of the loopback command. The transmission signal can be any suitable downlink signal.

In a receive RX signal step 46, a received signal is received from the at least one test radio head. The received signal comprises a loopback of the (known) transmission signal. When the loopback command of the send loopback signal step 40 only relates to one (or a subset) of a plurality of diversity paths, the received signal needs to only relate to the diversity path(s) of the loopback command.

In a determine performance step 48, a performance is determined by comparing the received signal with the (known) transmission signal. This comparison can compare the signal level over frequency as shown in FIGS. 4A-B above, to yield an SNR curve. In this way, a cable break can be determined when the comparing indicates a large attenuation in a particular frequency band. Also, a cross talk between cables can be determined when the comparing indicates a signal to noise ratio being lower than a threshold value. Moreover, a bad cable termination can be determined when the comparing indicates inter symbol interference between symbols of the received signal. When the loopback command of the send loopback signal step 40 only relates to one (or a subset) of a plurality of diversity paths, this step only compares the received signal with the (known) transmission signal of the diversity path(s) of the loopback command.

FIG. 5B is a flow chart illustrating a method similar to the method illustrated in FIG. 5A. Only new steps or steps which are modified compared to the method illustrated in FIG. 5A will be described below.

In an optional select radio heads to test step 39, the at least one test radio head is selected to comprise a plurality of radio heads, at least for the first time this step is performed. In line with what is explained above with reference to FIG. 3B, testing can be performed in a hierarchical fashion with gradually smaller sets of test radio heads to thereby determine which remote radio head(s) is affected by an issue.

In an optional adjust link adaptation step 41, link adaptation is adjusted when the loopback command of the send loopback signal step 40 only relates to one (or a subset) of a plurality of diversity paths. This means adjusting transmission and reception to only the diversity path(s) not used in the loopback. This can e.g. comprise using a more robust modulation and encoding for the uplink, which improves performance during the test.

Optionally, a reduce interference step 50 reduces interference from uplink transmissions of wireless devices. This interference can affect the received signal from the at least one test radio head. As explained above, the IRU combines the received signals from several remote radio heads. Hence, when only a subset of these remote radio heads are set in loopback mode, any uplink transmission resulting in signals received by the other remote radio heads (being in normal mode) can interfere with the received loopback signal. If the uplink transmissions to the other remote radio heads only occupy a small fraction of the time, this might not be a problem that needs to be addressed. However, if the uplink transmissions to the other remote radio heads occupy a large fraction of the time, the loopback signal is likely to be interfered with by the combination with uplink transmissions to the other remote radio heads. In this case, interference from received signals from other remote radio heads, being in normal mode, should be avoided. The reduce interference step can comprise either one or both of a mute signal step 43, and a temporarily limit UL step 44.

In the optional send mute signal step 43, a mute signal is sent to any radio heads connected to the network node to which the loopback signal is not sent. Since received signals are combined, it may be of great benefit to mute reception of remote radio heads which are not tested for the duration of the test. When the loopback signal includes a time period, the mute signal comprises the equivalent time period. When the loopback command of the send loopback signal step 40 only relates to one (or a subset) of a plurality of diversity paths, this step only needs to mute signals on the diversity path(s) of the loopback signal.

In the optional temporarily limit UL step 44, transmission of uplink transmissions is temporarily limited of wireless devices being at risk of transmitting interfering signal. This can, for instance, comprise refraining from sending uplink transmission grants to all wireless devices connected to the network node or those wireless devices which are at risk of affecting the loopback function. In one embodiment, the wireless devices being at risk of transmitting interfering signal are wireless devices which are in the vicinity of the remote radio head or remote radio heads which is/are being tested. The position of wireless devices can e.g. be determined by comparing received power measurements from respective remote radio head devices and comparing with a schedule of uplink transmissions.

Transmission of uplink transmissions is limited in a time period which is equivalent to the time for when the loopback is active. In one embodiment, when muting is not applied and when the loopback command of the send loopback signal step 40 only relates to one (or a subset) of a plurality of diversity paths, this step limits uplink transmissions generally, since uplink signals will be received by other (non-loopback) remote radio heads also on the diversity path of the loopback and will thus be combined with the loopback signal in the IRU.

In an optional conditional repeat step 49, the result of the determine performance step 48 is evaluated. When the determine performance step 48 results in a problem being found and there are too many simultaneously tested remote radio heads to distinguish a deteriorated link, the method returns to the select radio heads to test step 39, for another selection of one or more radio heads. Further radio heads to test can e.g. be determined when several remote radio heads are first tested concurrently and an issue is found for all of the remote radio heads. Testing can then proceed for smaller groups of remote radio heads and/or individual remote radio heads as explained with reference to FIG. 3B above. No repeating is performed when the determine performance step 48 results in that no problems are found.

In an optional conditional any issue step 45, it is determined whether any issues have been found during the loopback testing. If no issues have been found, the method ends. If any issues have been found, the method proceeds to an optional reallocate step 47.

In the optional reallocate step 47, frequency band usage is reallocated to avoid one or more frequencies where issues have been found, e.g. as shown in FIG. 4B and explained above. Alternatively or additionally, a message is generated to inform an operator or a system management system of the issue or issues that have been found.

Optionally, the method is repeated periodically or on command from an operator.

Figure 6:
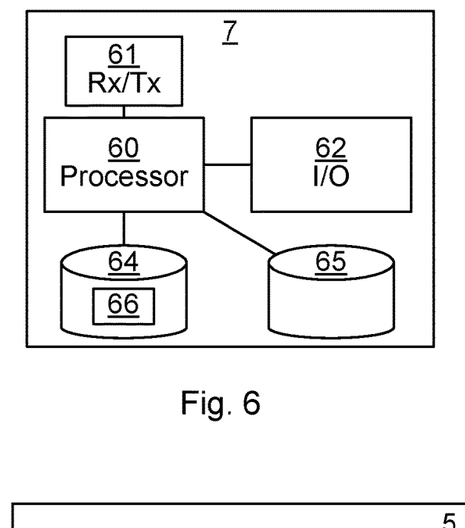
FIG. 6 is a schematic diagram showing some components of an embodiment of the radio base station of FIGS. 1A-D.

FIG. 6 is a schematic diagram showing some components of the radio base station 7 of FIGS. 1A-D. A processor 60 is provided using any combination of one or more of a suitable central processing unit (CPU), multiprocessor, microcontroller, digital signal processor (DSP), application specific integrated circuit etc., capable of executing software instructions 66 stored in a memory 64, which can thus be a computer program product. The processor 60 can be configured to execute the methods described with reference to FIGS. 5A-B above.

The memory 64 can be any combination of read and write memory (RAM) and read only memory (ROM). The memory 64 also comprises persistent storage, which, for example, can be any single one or combination of magnetic memory, optical memory, solid state memory or even remotely mounted memory.

A data memory 65 can be any combination of read and write memory (RAM) and read only memory (ROM). The data memory 65 may also comprise persistent storage, which, for example, can be any single one or combination of magnetic memory, optical memory, solid state memory or even remotely mounted memory.

The radio base station 7 further comprises an I/O (input/output) interface 62 for communicating with an IRU, a core network and optionally with other radio base stations.

The radio base station 7 also comprises one or more transceivers 61, comprising analogue and digital components for radio communication with wireless devices within one or more radio cells, e.g. using remote radio heads as described above. The processor 60 controls the general operation of the radio base station 7, e.g. by sending control signals to the transceiver 61 and receiving reports from the transceiver 61 of its operation.

Other components of the radio base station 7 are omitted in order not to obscure the concepts presented herein.

Figure 7:
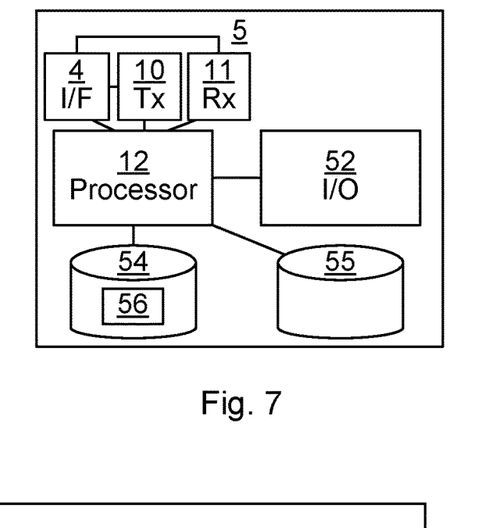
FIG. 7 is a schematic diagram showing some components of an embodiment of the intermediate radio unit of FIGS. 1A-D.

FIG. 7 is a schematic diagram showing some components of any one of the intermediate radio units 5 of FIGS. 1A-D, here represented by a single intermediate radio unit 5. A processor 12 is provided using any combination of one or more of a suitable central processing unit (CPU), multiprocessor, microcontroller, digital signal processor (DSP), application specific integrated circuit etc., capable of executing software instructions 56 stored in a memory 54, which can thus be a computer program product. The processor 12 can be configured to execute the methods described with reference to FIGS. 5A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 55 can be any combination of read and write memory (RAM) and read only memory (ROM). The data memory 55 may also comprise persistent storage, which, for example, can be any single one or combination of magnetic memory, optical memory, solid state memory or even remotely mounted memory.

The intermediate radio unit 5 further comprises an interface circuitry 4, a transmitter back-end 10 and receiver back-end 11 which operate as described with reference to FIGS. 1A-D above.

The intermediate radio unit 5 may separate from and connected to a radio base station, or form part of a hosting radio base station, communicated with using an I/O interface 52. When the intermediate radio unit 5 forms part of a hosting radio base station, some or all of the components of FIG. 7 may also be used for other purposes within the radio base station and may e.g. be the equivalent components shown in FIG. 6.

Other components of the intermediate radio unit 5 are omitted in order not to obscure the concepts presented herein.

Figure 8:
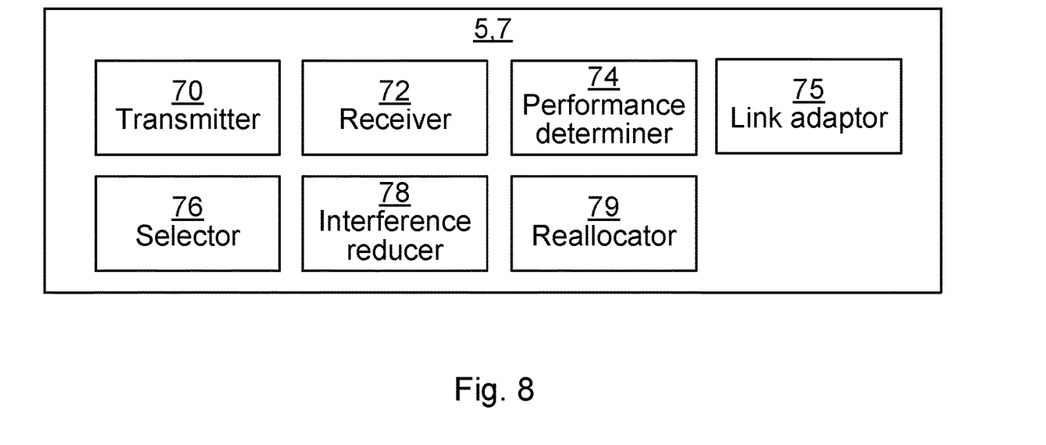
FIG. 8 is a schematic diagram showing functional modules of the radio base station and/or the intermediate radio unit of FIGS. 1A-D.

FIG. 8 is a schematic diagram showing functional modules of an embodiment of the radio base station and/or the intermediate radio unit of FIGS. 1A-D. The modules can be implemented using software instructions such as a computer program executing in the radio base station 7 and/or the intermediate radio unit 5 and/or using hardware, such as application specific integrated circuits, field programmable gate arrays, discrete logical components, etc. The modules correspond to the steps in the methods illustrated in FIGS. 5A-B.

A transmitter 70 is configured to send a loopback signal to at least one test radio head to add a loopback of its transmission signal on its receiving signal, and to send a transmission signal to the at least one test radio head. Optionally, the transmitter 70 is also configured to send a mute signal to any radio heads connected to the network node to which the loopback signal is not sent. This module corresponds to the send loopback signal step 40 and the send TX signal step 42 of FIGS. 5A-B.

A receiver 72 is configured to receive a received signal from the at least one test radio head. This module corresponds to the receive RX signal step 46 of FIGS. 5A-B.

A performance determiner 74 is configured to determine a performance by comparing the received signal with the transmission signal. This module corresponds to the determine performance step 48 of FIGS. 5A-B.

A link adaptor 75 is arranged to adjust link adaptation when the loopback command of the send loopback signal step 40 only relates to one (or a subset) of a plurality of diversity paths. This module corresponds to the adjust link adaptation step 41 of FIG. 5B.

A selector 76 is configured to select the at least one test radio head to comprise a plurality of radio heads. This module corresponds to the select radio heads to test step 39 of FIG. 5B.

An interference reducer 78 is configured to reduce interference of wireless devices on the received signal from the at least one test radio head. This module corresponds to the reduce interference step 50, the send mute signal step 43 and the temporarily limit UL step 44 of FIG. 5B.

A reallocator 79 is configured to reallocate frequency band usage when needed. This module corresponds to the reallocate step 47 of FIG. 5B.

Figure 9:
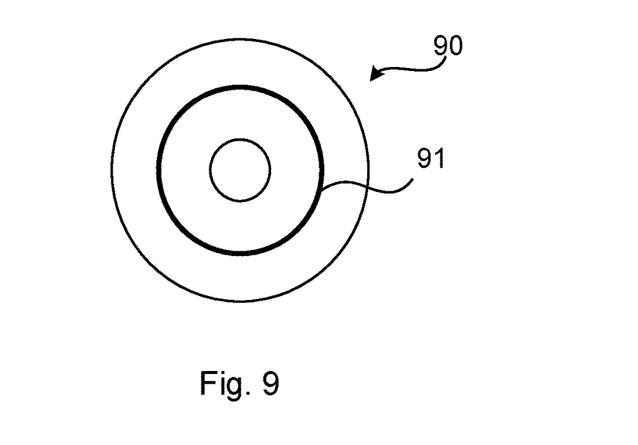
FIG. 9 shows one example of a computer program product comprising computer readable means.

FIG. 9 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 6 or the computer program product 56 of FIG. 7. While the computer program 91 is here schematically shown as a track on the depicted optical disk, the computer program can be stored in any way which is suitable for the computer program product.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for evaluating performance between a network node and at least one test radio head of a plurality of test radio heads, each one of the plurality of test radio heads being located remotely from the network node and connected to the network node via at least one respective cable, the method being performed in the network node, the method comprising:
    sending a loopback signal to the at least one test radio head of the plurality of test radio heads to add a loopback of a transmission signal as a received signal for a loopback mode, the loopback including a coupler and a mixer, the coupler to couple a portion of a transmission signal to be switched to the mixer, when in the loopback mode, and the mixer to convert the portion of the transmission signal, at a transmission frequency, to the received signal, at a receive frequency, to be switched to a receive path of the at least one test radio head, the transmission frequency being different than the receive frequency;
    sending the transmission signal to the at least one test radio head;
    reducing interference on the received signal from the at least one test radio head from uplink transmissions of wireless devices of other test radio heads of the plurality of test radio heads to which the loopback signal is not sent, the received signal transmitted via the at least one respective cable, and wherein the network node includes a combiner that combines the received signal from the at least one test radio head with signals received from other test radio heads of the plurality of test radio heads and that further functions as a splitter to provide transmission signals to be sent from the network node to each test radio head of the plurality of test radio heads;
    receiving the received signal from the at least one test radio head when in the loopback mode; and
    determining a performance by comparing the received signal with the transmission signal.

2. The method according to claim 1, wherein the reducing interference comprises:
    temporarily limiting transmission of uplink transmissions of wireless devices being at risk of transmitting interfering signal.

3. The method according to claim 2, wherein the step of temporarily limiting comprises refraining from sending uplink transmission grants to wireless devices connected to the network node.

4. The method according to claim 2, wherein the step of temporarily limiting comprises limiting uplink power for wireless devices connected to the network node.

5. The method according to claim 2, wherein the reducing interference comprises:
    sending a mute signal to any radio heads connected to the network node to which the loopback signal is not sent.

6. The method according to claim 1, further comprising the step of:
    selecting the at least one test radio head to comprise a plurality of radio heads.

7. The method according to claim 6, further comprising the steps of:
    when the step of determining results in a problem being found, repeating the method for a new selection of at least one radio head; and
    when the step of determining results in that no problems are found, ending the method.

8. The method according to claim 1, wherein the step of determining comprises determining a cable break when the comparing indicates a large attenuation in a particular frequency band.

9. The method according to claim 1, wherein the step of determining comprises determining a cross talk when the comparing indicates a signal to noise ratio being lower than a threshold value.

10. The method according to claim 1, wherein the step of determining comprises determining a bad cable termination when the comparing indicates inter symbol interference.

11. The method according to claim 1, wherein the step of sending a loopback signal comprises sending a loopback signal to add a loopback of its transmission signal on its receiving signal for only one of a plurality of diversity paths.

12. A network node for evaluating performance between the network node and at least one test radio head of a plurality of test radio heads, each one of the plurality of test radio heads being located remotely from the network node and connected to the network node via at least one respective cable, the network node comprising:
    a processor; and
    a memory storing instructions that, when executed by the processor, cause the network node to:
        send a loopback signal to the at least one test radio head of the plurality of test radio heads to add a loopback of a transmission signal as a received signal for a loopback mode, the loopback including a coupler and a mixer, the coupler to couple a portion of a transmission signal to be switched to the mixer, when in the loopback mode, and the mixer to convert the portion of the transmission signal, at a transmission frequency, to the received signal, at a receive frequency, to be switched to a receive path of the at least one test radio head, the transmission frequency being different than the receive frequency;
        reduce interference on the received signal from the at least one test radio head from uplink transmissions of wireless devices of other test radio heads of the plurality of test radio heads to which the loopback signal is not sent, the received signal transmitted via the at least one respective cable, and wherein the network node includes a combiner that combines the received signal from the at least one test radio head with signals received from other test radio heads of the plurality of test radio heads and that further functions as a splitter to provide transmission signals to be sent from the network node to each test radio head of the plurality of test radio heads;

send the transmission signal to the at least one test radio head when in the loopback mode;

receive a received signal from the at least one test radio head; and determine a performance by comparing the received signal with the transmission signal.

13. The network node according to claim 12, wherein the instructions to reduce interference further cause the network node to temporarily limit transmission of uplink transmissions of wireless devices being at risk of transmitting interfering signal.

14. The network node according to claim 13, wherein the instructions to temporarily limit comprise instructions that, when executed by the processor, causes the network node to refrain from sending uplink transmission grants to wireless devices connected to the network node.

15. The network node according to claim 13, wherein the instructions to temporarily limit comprise instructions that, when executed by the processor, causes the network node to limit uplink power for wireless devices connected to the network node.

16. The network node according to claim 12, wherein the instructions to reduce interference further cause the network node to send a mute signal to any radio heads connected to the network node to which the loopback signal is not sent.

17. The network node according to claim 12, further comprising instructions that, when executed by the processor, causes the network node to select the at least one test radio head to comprise a plurality of radio heads.

18. The network node according to claim 17, further comprising instructions that, when executed by the processor, causes the network node to, when the instructions to determine results in a problem being found, repeat the evaluation of performance for a new selection of at least one radio head of at least one radio head; and when the instructions to determining results in that no problems are found, ending the evaluation of performance.

19. The network node according to claim 12, wherein the instructions to determine comprise instructions that, when executed by the processor, causes the network node to determine a cable break when the comparing indicates a large attenuation in a particular frequency band.

20. The network node according to claim 12, wherein the instructions to determine comprise instructions that, when executed by the processor, causes the network node to determine a cross talk when the comparing indicates interference.

21. The network node according to claim 12, wherein the instructions to determine comprise instructions that, when executed by the processor, causes the network node to determine a bad cable termination when the comparing indicates inter symbol interference.

22. The network node according to claim 12, wherein the instructions to send a loopback signal comprise instructions that, when executed by the processor, causes the network node to send a loopback signal to add a loopback of its transmission signal on its receiving signal for only one of a plurality of diversity paths.

23. A non-transitory computer-readable storage medium storing instructions for evaluating performance between a network node and at least one test radio head of a plurality of test radio heads, each one of the plurality of test radio heads being located remotely from the network node and connected to the network node via at least one respective cable, wherein the instructions, when executed by a processor of the network node, cause the network node to:

send a loopback signal to the at least one test radio head of the plurality of test radio heads to add a loopback of a transmission signal as a received signal for a loopback mode, the loopback including a coupler and a mixer, the coupler to couple a portion of a transmission signal to be switched to the mixer, when in the loopback mode, and the mixer to convert the portion of the transmission signal, at a transmission frequency, to the received signal, at a receive frequency, to be switched to a receive path of the at least one test radio head, the transmission frequency being different than the receive frequency;

reduce interference on the received signal from the at least one test radio head from uplink transmissions of wireless devices of other test radio heads of the plurality of test radio heads to which the loopback signal is not sent, the received signal transmitted via the at least one respective cable, and wherein the network node includes a combiner that combines the received signal from the at least one test radio head with signals received from other test radio heads of the plurality of test radio heads and that further functions as a splitter to provide transmission signals to be sent from the network node to each test radio head of the plurality of test radio heads;

send the transmission signal to the at least one test radio head;

receive the received signal from the at least one test radio head when in the loopback mode; and determine a performance by comparing the received signal with the transmission signal.

* * * * *

UNITED STATES PATENT AND TRADEMARK OFFICE
CERTIFICATE OF CORRECTION

PATENT NO. : 10,708,868 B2
APPLICATION NO. : 15/123566
DATED : July 7, 2020
INVENTOR(S) : Osterling et al.

Page 1 of 2

It is certified that error appears in the above-identified patent and that said Letters Patent is hereby corrected as shown below:

On the Title Page

Item (72), under "Inventors", in Column 1, Line 1, delete "Jarfalla (SE);" and insert -- Järfälla (SE); --, therefor.

In the Drawings

In Fig. 1C, Sheet 2 of 7, delete " 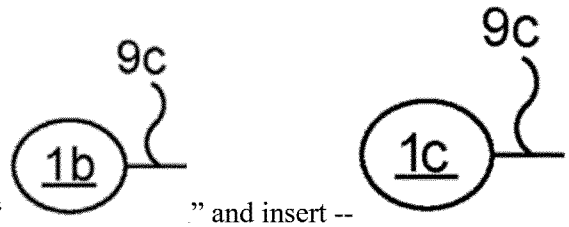 " and insert -- -- , therefor.

In the Specification

In Column 2, Line 41, delete "avoided" and insert -- avoided. --, therefor.

In Column 5, Line 38, delete "head." and insert -- head; --, therefor.

In Column 6, Line 10, delete "W-CDMA (Wideband Code Division Multiplex)," and insert -- W-CDMA (Wideband Code Division Multiple Access), --, therefor.

In Column 10, Line 26, delete "spacial diversity" and insert -- spatial diversity --, therefor.

In Column 11, Line 13, delete "in in" and insert -- in --, therefor.

In Column 12, Line 64, delete "between to the" and insert -- to the --, therefor.

Signed and Sealed this
Fifth Day of January, 2021

Andrei Iancu
*Director of the United States Patent and Trademark Office*

CERTIFICATE OF CORRECTION (continued)
U.S. Pat. No. 10,708,868 B2

In Column 15, Lines 29-30, delete "read and write memory (RAM)" and insert -- random access memory (RAM) --, therefor.

In Column 15, Lines 35-36, delete "read and write memory (RAM)" and insert -- random access memory (RAM) --, therefor.

In Column 15, Lines 65-66, delete "read and write memory (RAM)" and insert -- random access memory (RAM) --, therefor.

In Column 16, Lines 4-5, delete "read and write memory (RAM)" and insert -- random access memory (RAM) --, therefor.